(12) United States Patent
Ivel et al.

(10) Patent No.: US 6,227,092 B1
(45) Date of Patent: May 8, 2001

(54) QUICK DISCONNECT FOR A MOTOR DRIVEN SLITTING KNIFE

(75) Inventors: Leonard Ivel, Leicester; Kenneth Stidsen, Jr., Sterling, both of MA (US)

(73) Assignee: Dienes Corporation, Spencer, MA (US)

( * ) Notice: Subject to any disclaimer, the term of this patent is extended or adjusted under 35 U.S.C. 154(b) by 0 days.

(21) Appl. No.: 09/342,232

(22) Filed: Jun. 29, 1999

(51) Int. Cl.[7] .................................................. B26D 7/26
(52) U.S. Cl. .......................... 83/481; 83/665; 83/698.41
(58) Field of Search .................... 83/481, 482, 665, 83/698.41, 676; 72/481

(56) References Cited

U.S. PATENT DOCUMENTS

| | | | |
|---|---|---|---|
| 3,985,066 | * 10/1976 | Kern .................................... | 93/58.2 |
| 4,315,425 | * 2/1982 | Zbornik et al. ..................... | 72/481 |
| 4,339,893 | * 7/1982 | Fournier ............................... | 83/676 |
| 4,730,529 | 3/1988 | Schroder ............................ | 83/425.4 |
| 4,895,014 | * 1/1990 | Houston ............................... | 72/481 |
| 4,909,113 | * 3/1990 | Ischenko et al. .................. | 83/676 |
| 4,934,238 | * 6/1990 | Lauffer ................................ | 83/676 |
| 5,048,388 | * 9/1991 | Kobayashi et al. ................. | 83/504 |
| 5,058,475 | * 10/1991 | Tidland et al. ..................... | 83/481 |
| 5,061,129 | * 10/1991 | Baudermann ....................... | 83/676 |
| 5,107,737 | * 4/1992 | Tagliaferri .......................... | 83/676 |
| 5,174,184 | * 12/1992 | Meeks ................................. | 83/676 |
| 5,394,779 | * 3/1995 | Meeks ................................. | 83/676 |

FOREIGN PATENT DOCUMENTS 3637-733-A * 5/1987 (DE) .................................... 83/481

* cited by examiner

Primary Examiner—Rinaldi I. Rada
Assistant Examiner—Melissa L. Hall
(74) Attorney, Agent, or Firm—Sughrue, Mion, Zinn, Macpeak & Seas, PLLC

(57) ABSTRACT

A motor driven slitting knife assembly is provided with a quick disconnect arrangement for permitting rapid replacement of a slitting knife. The motor is provided with a rotatable hub having a radially extending flange. A slitting knife is mounted on one side of the flange and a piston and cylinder assembly is mounted on an opposite side of the flange. A plurality of headed bolts are mounted on the piston and extend through elongated slots in the slitting knife. The elongated slots have an enlarged end and a smaller end whereby, upon rotation of the knife in one direction with the heads of the bolts out of engagement with the knife, the knife may be removed over the heads of the bolts and upon rotation of the knife in the opposite direction, the heads can engage the knife upon movement of the headed bolts to clamp the knife against the flange for rotation therewith.

3 Claims, 4 Drawing Sheets

QUICK DISCONNECT FOR A MOTOR DRIVEN SLITTING KNIFE

BACKGROUND OF THE INVENTION

The present invention is directed to a quick disconnect for a rotary mounted slitting knife and more specifically, to an actuator for simultaneously releasing a plurality of knife clamping members to facilitate rapid replacement of a knife.

Typically, a slitting knife is bolted to a rotating member. When a knife needs to be replaced for sharpening, the bolts must be removed and the production line must be shut down for the period that it takes to change the knife. A typical knife mounting has mounting pilots and a bolt hole circle on a flange for receiving the knife.

The U.S. Patent to Tidland et al. (U.S. Pat. No. 5,058,475) and the U.S. Patent to Newton (U.S. Pat. No. 5,198,892) both disclose retaining rings having elongated slots with enlarged end portions for engagement with bolts threaded into the hub and extending through the slots. The clamping ring and slots of Tidland et al. are best seen in FIG. 10 whereas the clamping assembly of Newton is best seen in FIG. 1. However, both of these patents require the loosening of each individual bolt before the retaining plate can be rotated and removed to allow replacement of the cutting blade.

The U.S. Patent to Kobayashi (U.S. Pat. No. 5,048,388) discloses a rotary knife assembly wherein the rotary knife is fitted on a reduced diameter portion of a flange. A resilient member is mounted on the flange for urging the rotary knife toward the flange portion and there is a shifting mechanism mounted on the flange for shifting the rotary knife in a direction away from the flange against the urging force of the resilient member. In the embodiment shown in FIG. 10, a hydraulic piston and cylinder arrangement is provided for moving a plunger member 35 into and out of engagement with the rotary knife to move it against the resilient member. However, the piston and cylinder arrangement is not disclosed for use with studs for simultaneously moving a plurality of studs out of engagement with a retaining plate to permit replacement of the rotary knife.

SUMMARY OF THE INVENTION

The present invention is directed to a quick disconnect arrangement for a rotary mounted slitting knife which is adapted to be clamped to a rotatable hub by means of a plurality of headed studs. The knife is in the form of an annular element having a plurality of locking slots. Several knife mounting studs are secured to an annular actuating member. By placing the knife over the studs so that the studs extend through an enlarged portion of each slot and rotating the knife to bring the shank of each stud into the smaller end of the slots, the actuating member can be moved to clamp the knife in place. The studs are mounted on an actuating member which is shifted axially thereby facilitating a rapid changing operation for the knife.

Further features and advantages of the invention will become more clearly apparent from the following description of some preferred embodiments of a construction element according to the invention, given by way of non-limitative examples with reference to the accompanying drawings.

BRIEF DESCRIPTION OF THE DRAWING FIGURES

DETAILED DESCRIPTION OF A PREFERRED EMBODIMENT OF THE INVENTION

Figure 1:
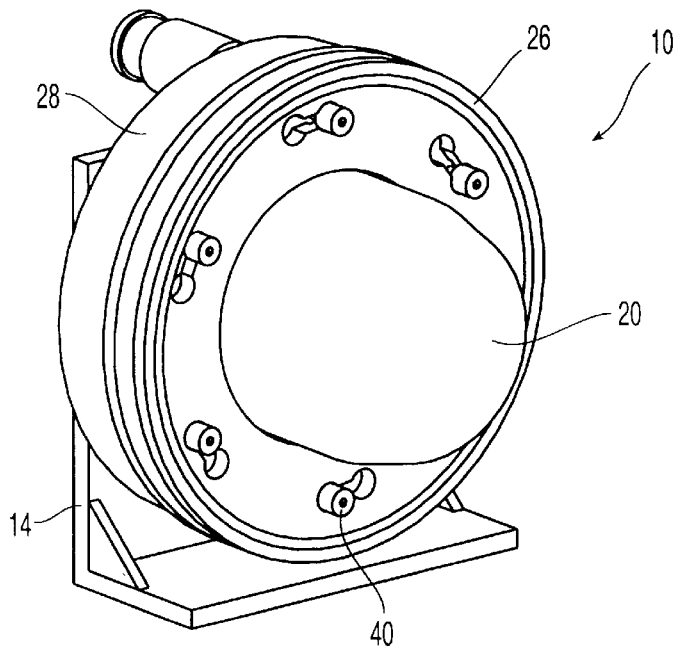
FIG. 1 is a perspective view of a motor driven slitting knife assembled for rotation with a rotary hub of the motor.
Figure 2:
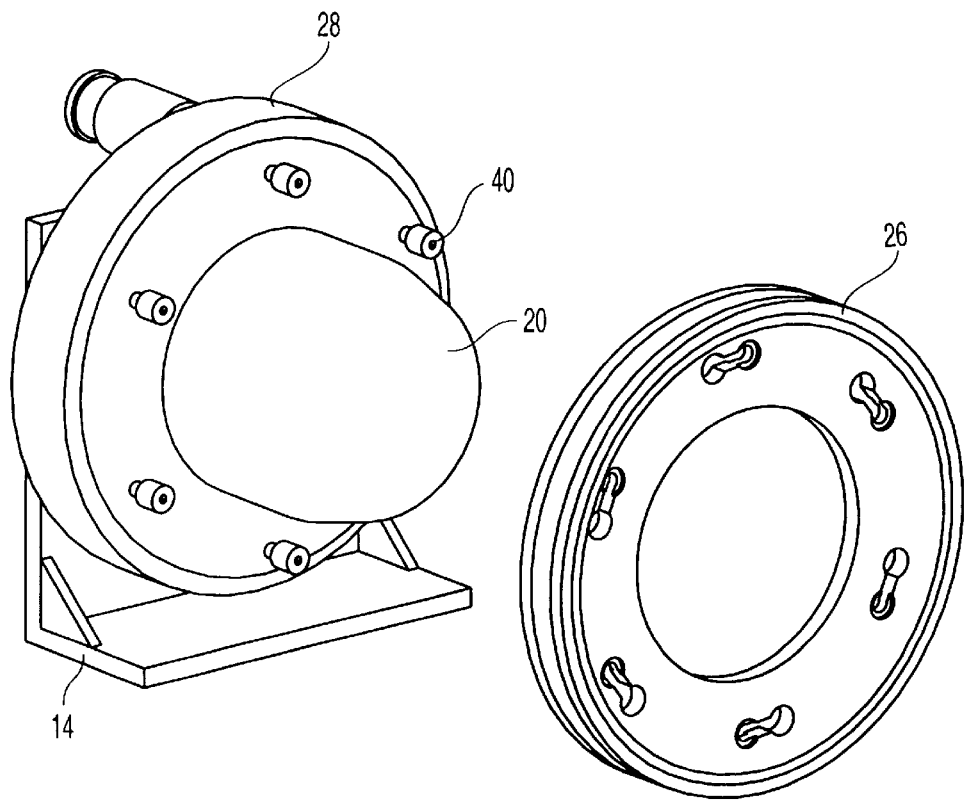
FIG. 2 is an exploded perspective view with the slitting knife spaced from the hub and the studs in the extended release condition.
Figure 3:
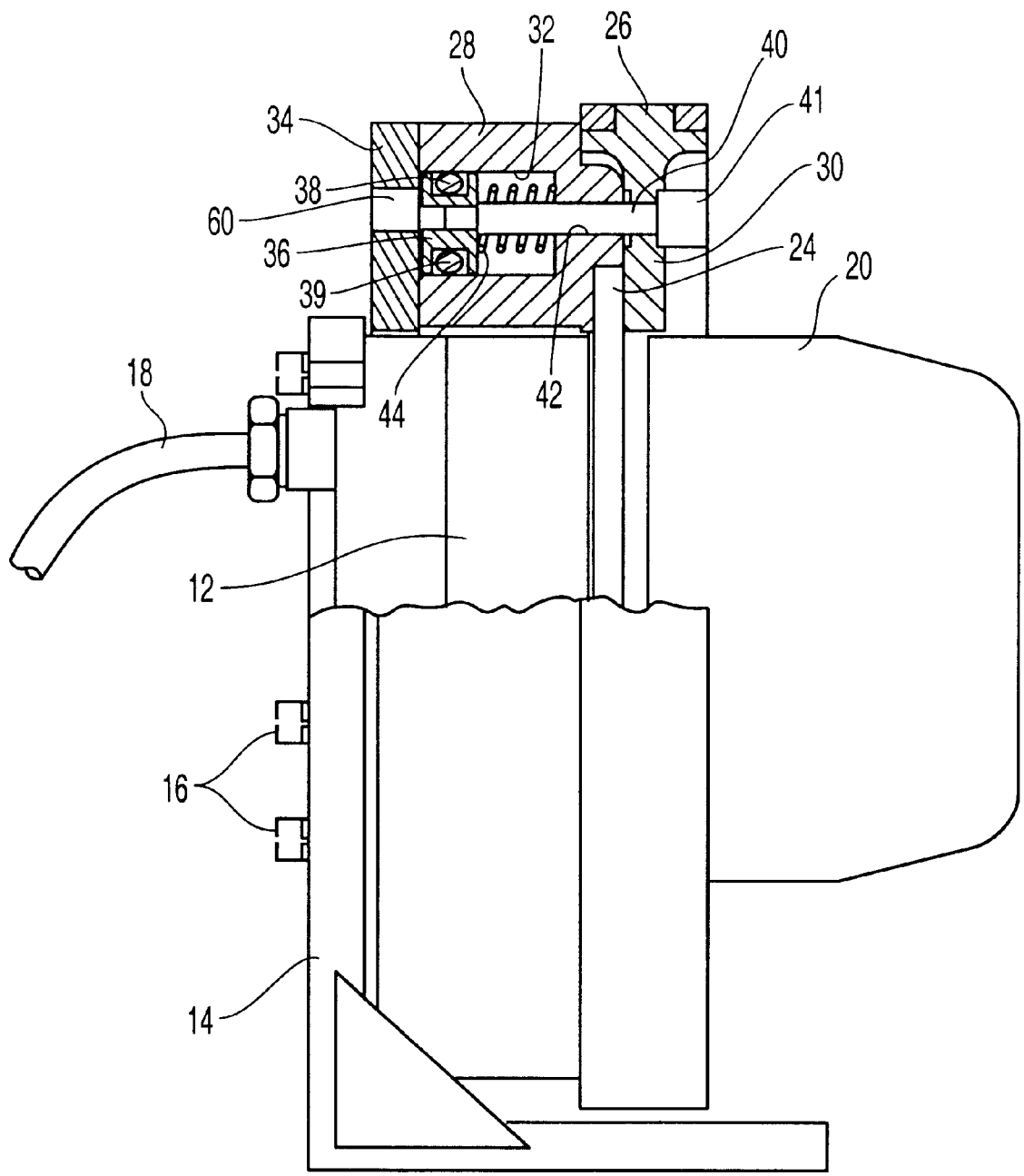
FIG. 3 is a side elevation view of a motor driven slitting knife assembly with the knife and hub shown in partial sectional view.

The motor driven slitting knife assembly 10 shown in FIGS. 1–3, is comprised of an electric motor 12 mounted on a base 14 by means of a plurality of bolts 16. A lead-in wire 18 is provided for connecting the motor 12 to a source of electric power.

The motor 12 is provided with a rotatable hub 20 The hub 20 is provided with a flange 24 which rotates therewith for imparting a drive to a support member 28.

The annular knife support member 28 is mounted for rotation with the flange 24 on the hub 20. The support member 28 may be secured to the flange 24 by any suitable means (not shown).

The support member 28 is provided with an annular recess 32 which is closed at one end by a cover plate 34 which is secured thereto by any suitable means (not shown). An annular piston 36 is slidably mounted in the annular recess 32 and is sealed thereto by means of an O rings 38 and 39 disposed in peripheral grooves of the piston 36. A plurality of studs 40 having enlarged heads 41 are secured to the piston 36 in equally spaced relation and extend outwardly of the support member through a plurality of holes 42 in the support member 28. A spring member 44 surrounds each stud 40 within the annular recess 32 for normally biasing the annular piston 36 toward the cover plate 34. The headed studs 40 extend outwardly of the support member 28 a sufficient distance to allow for clamping of the flange 30 of the slitting knife 26 between the head 41 of each stud and the support member 28.

Figure 4:
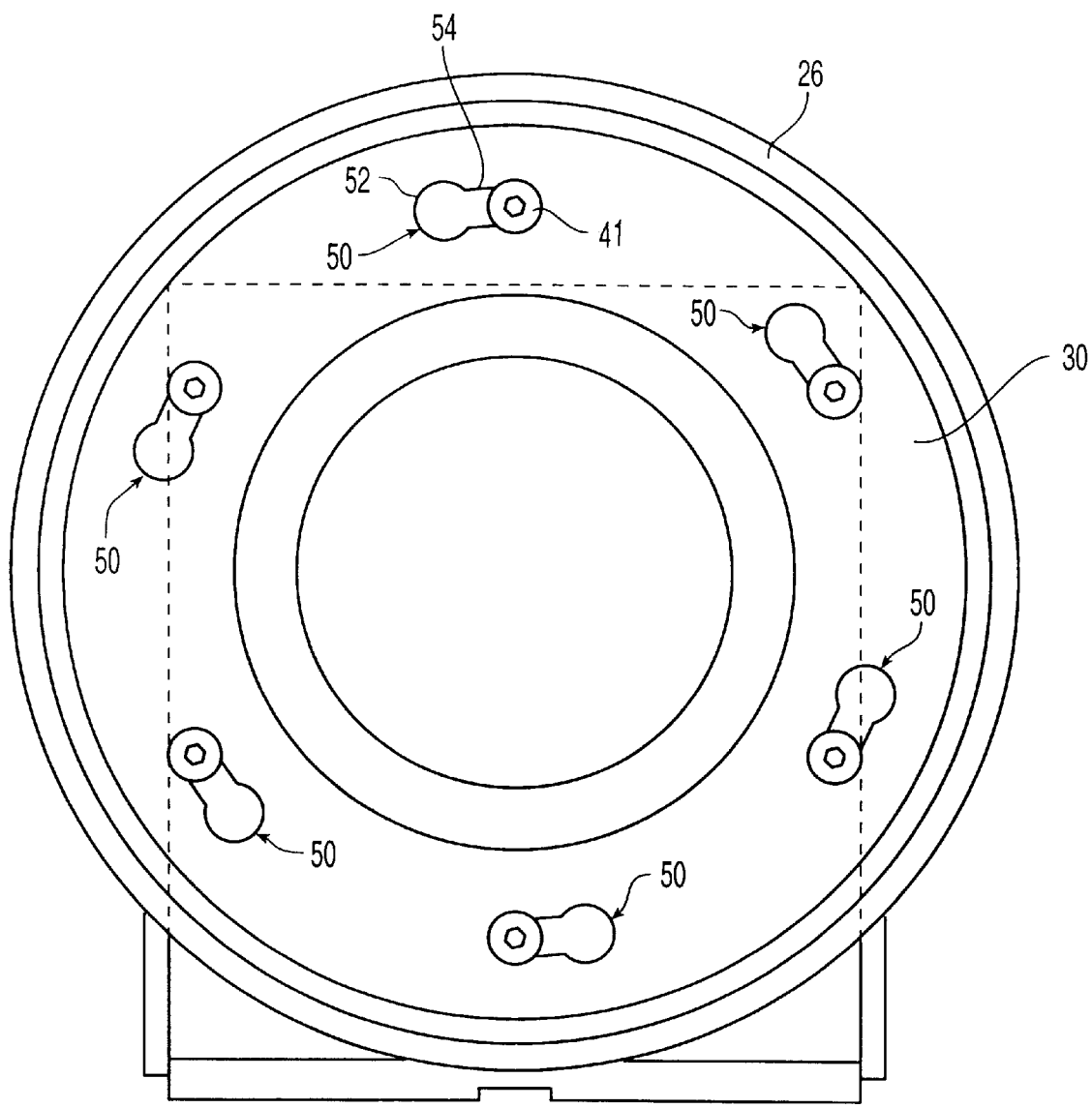
FIG. 4 is an end elevation view showing the slitting knife clamped against the support member.
Figure 5:
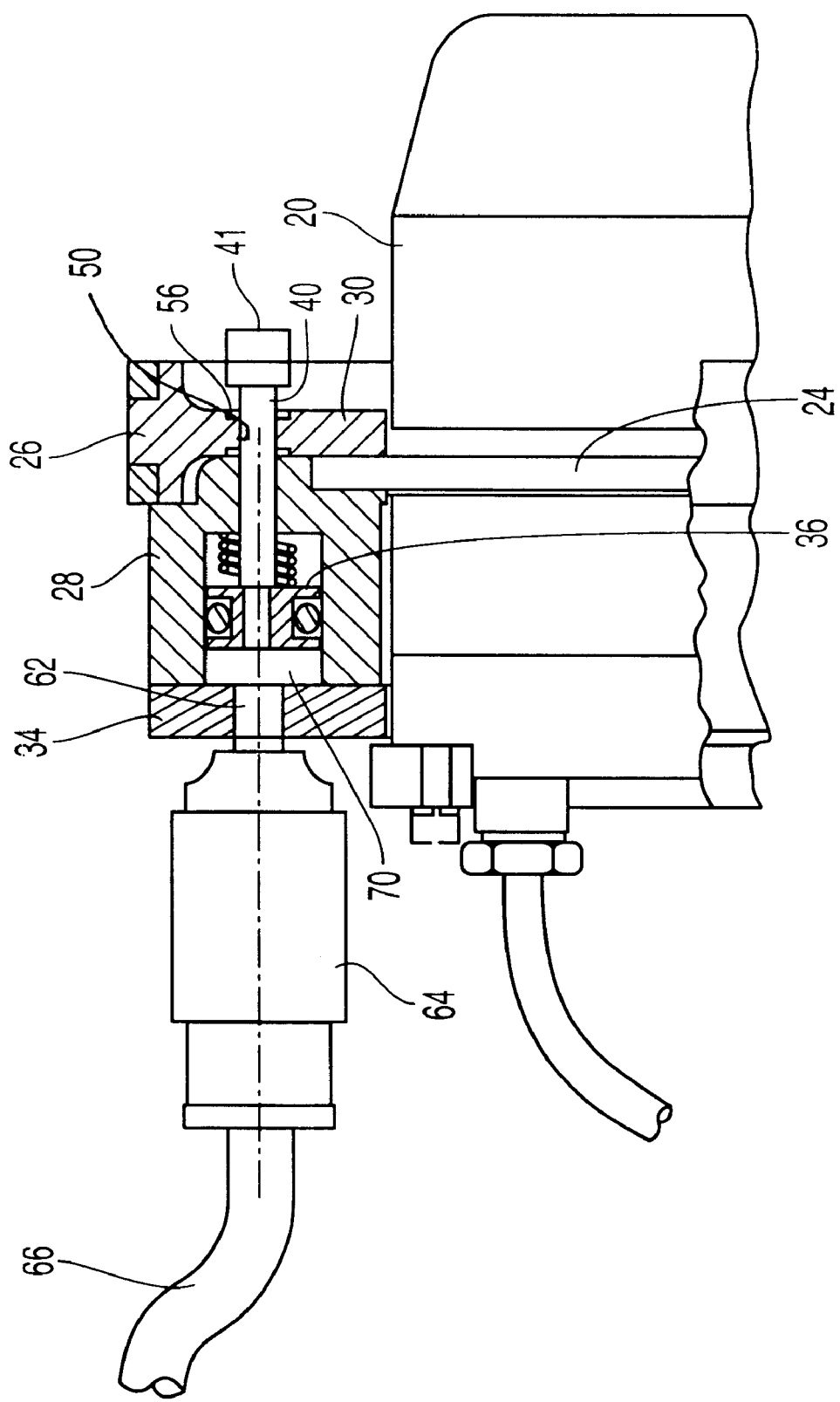
FIG. 5 is a view similar to FIG. 3 with a pneumatic pressure source connected to the cover plate and the stud carrying actuating member in the release position relative to the slitting knife.

The flange 30 of the slitting knife 26 is provided with 6 elongated apertures 50 as shown in FIGS. 4 and 5. Each aperture 50 is provided with an enlarged end 52 having a circular configuration with a diameter larger than the diameter of the head 41 of each clamping bolt 40. Each opening 50 has a narrow slot 54 and at the opposite end thereof, a recess 56 is provided for receiving the head 41 of a bolt 40 when the slitting blade 26 is clamped between the headed bolt and the support member 28, as shown in FIG. 3. This will prevent any relative rotational movement between the slitting blade 26 and the support member 28, while in the clamped condition.

The cover plate 34 is provided with a single hole 60 for receiving a nozzle 62 of a pneumatic head 64 connected to a suitable supply source (not shown) of pressurized air through the hose 66.

When it is necessary to replace the slitting blade 26, the nozzle 62 of the pneumatic head 64 is fitted into the hole 60 in a substantially air tight manner. The pneumatic head 64 may be provided with a suitable valve control (not shown) for the control of the pressurized air or the pressurized air controlled by the pressure supply. Upon application of pressurized air into the pressure chamber 70, the piston 36 will be moved to the right, as shown in FIG. 5, thereby moving the headed bolts 40 out of engagement with the circular recesses or seats 56 in the flange 30 of the slitting knife 26. Since all 6 headed bolts 40 are mounted on the piston 36, all 6 bolts will simultaneously be released from the flange of the slitting knife 26. The slitting knife may then be rotated manually in a clock-wise direction, as viewed in FIG. 4 to bring the headed bolts 40 into alignment with the enlarged circular openings 52, whereby the slitting knife 26 may be moved in an axial direction, as shown in FIG. 2, to remove the knife. A new slitting knife 26 may then be placed over the headed bolts 40 in a reverse movement. Upon withdrawal of the pressure fitting 64 and the associated nozzle 62 from the hole 60, the pressure in the chamber 70 will be exhausted through the hole 60, thereby allowing the piston 36 to be moved to the left, as viewed in FIG. 5 under the action of the spring 44. This will move the heads of the bolts into the recesses 56 to clamp the flange 30 of the knife 26 against the support member 28. Thus, upon rotation of the rotatable hub, the slitting knife will be rotated therewith.

While the preferred embodiments have been described, variations thereto will occur to those skilled in the art within the scope of the present inventive concepts which are delineated by the following claims.

What is claimed is:

1. A rotary slitting knife assembly comprising a rotatable support member, an annular slitting knife disposed adjacent said support member, an actuating member movably mounted on said support member, a plurality of clamping members connected to said actuating member for simultaneous movement into and out of clamping engagement with said knife for clamping said knife to said rotatable support member for rotation therewith and releasing said knife for replacement of said knife upon movement of said actuating member relative to said knife, wherein said slitting knife is provided with a plurality of apertures therethrough and said clamping members are comprised of a plurality of bolts secured to said actuating member and extending through said apertures, said bolts having enlarged heads on an end thereof remote from said actuating member for engaging and clamping said knife to said rotatable support member.

2. A rotary slitting knife assembly as set forth in claim 1, wherein each of said apertures in said slitting knife are elongated in a circumferential direction with an enlarged portion at one end for permitting passage of a head on a bolt and a narrow portion at an opposite end thereof smaller than said head of a bolt.

3. A rotary slitting knife assembly as set forth in claim 1, further comprising pneumatic means detachably connected to said support member for supplying pressurized air to a side of said actuating member opposite said clamping members for moving said clamping members in one direction and spring means on an opposite side of said actuating member for biasing said clamping members in an opposite direction.

* * * * *